United States Patent
Chang et al.

(10) Patent No.: US 12,470,737 B1
(45) Date of Patent: Nov. 11, 2025

(54) IMAGE DECODING APPARATUS AND METHOD

(71) Applicant: REALTEK SEMICONDUCTOR CORPORATION, Hsinchu (TW)

(72) Inventors: Yi-Shu Chang, Hsinchu (TW); Wu-Jun Chen, Suzhou (CN); Wei Li, Suzhou (CN); Rong Zhang, Suzhou (CN); Wei-Min Zeng, San Jose, CA (US); Chi-Wang Chai, Santa Clara, CA (US)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/882,827

(22) Filed: Sep. 12, 2024

(51) Int. Cl.
| | | |
|---|---|---|
| *H04N 19/44* | (2014.01) | |
| *H04N 19/159* | (2014.01) | |
| *H04N 19/176* | (2014.01) | |
| *H04N 19/65* | (2014.01) | |
| *H04N 19/89* | (2014.01) | |

(52) U.S. Cl.
CPC ........... *H04N 19/44* (2014.11); *H04N 19/159* (2014.11); *H04N 19/176* (2014.11); *H04N 19/65* (2014.11); *H04N 19/89* (2014.11)

(58) Field of Classification Search
CPC .... H04N 19/176; H04N 19/105; H04N 19/52; H04N 19/70; H04N 19/159; H04N 19/119; H04N 19/186; H04N 19/513; H04N 19/132; H04N 19/46; H04N 19/139; H04N 19/157; H04N 19/109; H04N 19/51; H04N 19/56
See application file for complete search history.

(56) References Cited

U.S. PATENT DOCUMENTS

| 10,616,576 B2 | 4/2020 | Ameres | |
|---|---|---|---|
| 2012/0320991 A1* | 12/2012 | Ameres | H04N 19/139 |
| | | | 375/240.01 |
| 2021/0168401 A1* | 6/2021 | Park | H04N 19/102 |

OTHER PUBLICATIONS

OA letter of a counterpart TW application (appl. No. 113136246) mailed on Mar. 27, 2025.
Wen-Nung Lie, and Zhi-Wei Gao, "Video Error Concealment by Integrating Greedy Suboptimization and Kalman Filtering Techniques", IEEE Transactions on Circuits and Systems for Video Technology, vol. 16, No. 8, IEEE, Aug. 2006, p. 982-992.

* cited by examiner

*Primary Examiner* — Farhan Mahmud
(74) *Attorney, Agent, or Firm* — WPAT, PC (57) ABSTRACT

The present invention discloses an image decoding method. Error report information related to an error block in an N-th image frame generated according to an inter-frame coding technology is received by an image encoding apparatus when the image decoding apparatus receives a block of an N+P-1-th image frame. The N+P-th image frame is encoded according to the inter-frame coding technology. Blocks in the N-th image frame before the error block are decoded according to the inter-frame coding technology. A panning motion vector of an N-1-th image frame serves as the motion vector information and the residue information is set to be zero to decode the blocks from the error block to the N+P-1-th image frame according to the inter-frame coding technology. The motion vector information and the residue information of the inter-frame coding blocks in the N+P-th image frame are retrieved to perform decoding according to the inter-frame coding technology.

18 Claims, 5 Drawing Sheets

| | 301<br>MV2=(-2,0) | 302<br>MV3=(4,1) | |
|---|---|---|---|
| 300<br>MV1=(5,0) | 303<br>(N/A) | 304<br>(N/A) | 305<br>MV1=<br>(5,0) |
| | | 306<br>MV1=<br>(5,0) | 307<br>MV4=<br>(6,0) |
| 308<br>MV1=(5,0) | 309<br>(N/A) | 312<br>MV6=(4,0) | |
| 310<br>(N/A) | 311<br>MV5=(12,7) | | |

IMAGE DECODING APPARATUS AND METHOD

BACKGROUND OF THE INVENTION

1. Field of the Invention

The present invention relates to an image decoding apparatus and an image decoding method.

2. Description of Related Art

Along with the increase of the demands on multimedia entertainment and higher display quality from the customers, the requirements of the processing, transmission and storage resource of the video contents, e.g., the memory size and the bandwidth, increase as well. Lots of video standards are established to guarantee the display quality of the video contents and make a lot of progress on the compression and decompression efficiency.

However, during the transmission of the image stream, data loss happens. When the data is lost, the image decoding apparatus may not perform decoding correctly according to information, e.g., motion vector information and residue information, transmitted by the image encoding apparatus. If no strategy in response to the data loss is presented, the image decoding apparatus can not perform decoding to generate the correct decoded image frame.

SUMMARY OF THE INVENTION

In consideration of the problem of the prior art, an object of the present invention is to supply an image decoding apparatus and an image decoding method.

The present invention discloses an image decoding method used in an image decoding apparatus that includes steps outlined below. An occurrence of an error block in an N-th image frame generated according to an inter-frame coding technology in an image stream from an image encoding apparatus is determined, wherein N is an integer larger than 1. Error report information is transmitted to the image encoding apparatus such that the image encoding apparatus receives the error report information at a time spot that the image decoding apparatus receives a corresponding block of an N+P-1-th image frame and encodes an N+P-th image frame in the image stream by referring to a reference image frame previous to the N-th image frame that includes no error according to the inter-frame coding technology, wherein P is an integer larger than or equal to 1. Motion vector information and residue information corresponding to a plurality of first blocks in the N-th image frame before the occurrence of the error block are retrieved from the image stream, so as to perform a decoding process on the first blocks according to the inter-frame coding technology to generate a first decoded result. A panning motion vector is retrieved from an N-1-th image frame identified to be a panning image frame to set the panning motion vector to be the motion vector information and set the residue information to be a zero value, so as to perform the decoding process on a plurality of second blocks from the error block in the N-th image frame to a final block of the N+P-1-th image frame by referring to the N-1-th image frame to an N+P-2-th image frame in turn according to the inter-frame coding technology to generate a second decoded result. The motion vector information and the residue information of a plurality of inter-frame coding blocks corresponding to the N+P-th image frame are retrieved from the image stream to perform the decoding process on the inter-frame coding blocks according to the inter-frame coding technology to generate an inter-frame decoded result.

The present invention also discloses an image decoding apparatus that includes a front-end decoding circuit and a back-end decoding circuit. The front-end decoding circuit is configured to determine an occurrence of an error block in an N-th image frame generated according to an inter-frame coding technology in an image stream from an image encoding apparatus, wherein N is an integer larger than 1. The front-end decoding circuit is further configured to transmit error report information to the image encoding apparatus such that the image encoding apparatus receives the error report information at a time spot that the image decoding apparatus receives a corresponding block of an N+P-1-th image frame and encodes an N+P-th image frame in the image stream by referring to a reference image frame previous to the N-th image frame that includes no error according to the inter-frame coding technology, wherein P is an integer larger than or equal to 1. The back-end decoding circuit is configured to retrieve motion vector information and residue information corresponding to a plurality of first blocks in the N-th image frame before the occurrence of the error block from the image stream, so as to perform a decoding process on the first blocks according to the inter-frame coding technology to generate a first decoded result. The back-end decoding circuit is also configured to retrieve a panning motion vector from an N-1-th image frame identified to be a panning image frame to set the panning motion vector to be the motion vector information and set the residue information to be a zero value, so as to perform the decoding process on a plurality of second blocks from the error block in the N-th image frame to a final block of the N+P-1-th image frame by referring to the N-1-th image frame to an N+P-2-th image frame in turn according to the inter-frame coding technology to generate a second decoded result. The back-end decoding circuit further is configured to retrieve the motion vector information and the residue information of a plurality of inter-frame coding blocks corresponding to the N+P-th image frame from the image stream to perform the decoding process on the inter-frame coding blocks according to the inter-frame coding technology to generate an inter-frame decoded result.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide an image decoding apparatus and an image decoding method that retrieve a panning motion vector from an N−1-th image frame identified to be a panning image frame to set motion vector information to be the panning motion vector and set residue information to be a zero value under the condition that an error block occurs in the N-th image frame, so as to perform decoding on image blocks from the error block to a final block of an N+P−1-th image frame that a corresponding block corresponding to a time spot that the image encoding apparatus receives error report information resides. Such a technology allows the proceeding of the decoding process under the condition that both the accuracy and the fluency of the decoding process are maintained.

Figure 1:
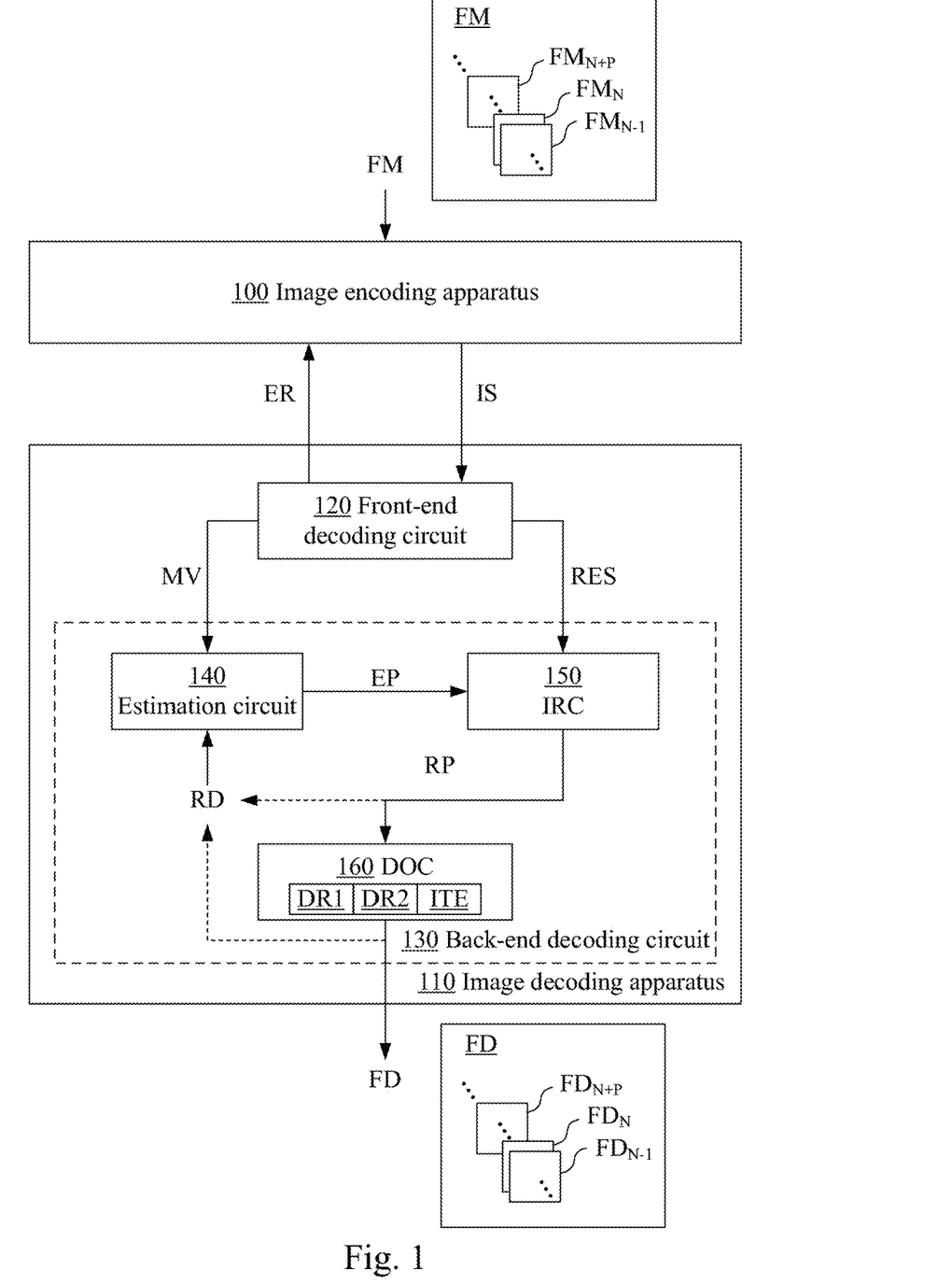
FIG. 1 illustrates a block diagram of an image encoding apparatus and an image decoding apparatus according to an embodiment of the present invention.

Reference is now made to FIG. 1. FIG. 1 illustrates a block diagram of an image encoding apparatus 100 and an image decoding apparatus 110 according to an embodiment of the present invention.

The image encoding apparatus 100 is configured to perform encoding on a plurality of image frames FM, e.g., an N−1-th image frame $FM_{N−1}$, an N-th image frame $FM_N$, ... and an N+P-th image frame $FM_{N−P}$ exemplarily illustrated in FIG. 1, according to an inter-frame coding technology to generate an image stream IS. N is an integer larger than 1, and P is an integer larger than or equal to 1.

More specifically, take the condition that the N-th image frame $FM_N$ serves as an image frame to be encoded as an example, the image encoding apparatus 100 performs encoding according to corresponding reference image data. The image encoding apparatus 100 may use at least one previous image frame previous to the N-th image frame $FM_N$ as the reference image data according to the inter-frame coding technology. For example, if a single previous image frame neighboring to the current image frame to be encoded is used as the reference image data, the image encoding apparatus 100 uses the N−1-th image frame $FM_{N−1}$ as the reference image data to encode the N-th image frame $FM_N$. However, in other embodiments, the image encoding apparatus 100 may use a single image frame (not illustrated in the figure) ahead of the N-th image frame $FM_N$ by K image frames as the reference image data, or use a plurality of image frames previous to the N-th image frame $FM_N$ as the reference image data. The present invention is not limited thereto.

On the other hand, the image encoding apparatus 100 may use the image content of the N-th image frame $FM_N$ itself as the reference image data to encode the N-th image frame $FM_N$ according to the intra-frame coding technology.

Corresponding to the inter-frame coding technology, the image encoding apparatus 100 performs motion compensation according to motion vector information from the image frame to the reference image data to generate residue information. The processing of such as, but not limited to discrete cosine transform (DCT), quantization and entropy coding is performed subsequently to generate the image stream IS. On the other hand, corresponding to the intra-frame coding technology, the image encoding apparatus 100 performs processing of such as, but not limited to discrete cosine transform, quantization and entropy coding on the current image frame to generate the image stream IS.

It is appreciated that for a single image frame, the image encoding apparatus 100 may perform the encoding process on different image blocks by using either the inter-frame coding technology or the intra-frame coding technology.

The image decoding apparatus 110 is configured to receive and perform decoding on the image stream IS to generate decoded image frames FD, e.g., an N−1-th image frame $FD_{N−1}$, an N-th decoded image frame $FD_N$, ... and an N+P-th decoded image frame $FD_{N−P}$ exemplarily illustrated in FIG. 1. The image decoding apparatus 110 includes a front-end decoding circuit 120 and a back-end decoding circuit 130.

The front-end decoding circuit 120 is configured to perform processing of such as, but not limited to entropy decoding, inverse quantization (IQ) and inverse transform (IT) on the image stream IS to retrieve motion vector information MV and residue information RES corresponding to different image frames.

The back-end decoding circuit 130 is configured to perform a decoding process. In an embodiment, the back-end decoding circuit 130 includes an estimation circuit 140, an image reconstruction circuit 150 (abbreviated as IRC in FIG. 1) and a deblock operation circuit 160 (abbreviated as DOC in FIG. 1).

Corresponding to the inter-frame coding technology, the estimation circuit 140 performs calculation according to reference image data RD and the motion vector information MV in the decoding process according to the inter-frame coding technology to generate a plurality of estimated pixels EP. The image reconstruction circuit 150 performs calculation according to the estimated pixels EP and the residue information RES in the decoding process to generate a plurality of reconstructed pixels RP. The deblock operation circuit 160 perform deblock operation according to the reconstructed pixels RP in the decoding process to generate the decoded result and further output the decoded image frames FD according to the decoded result. The decoded image frames FD can be fed to the estimation circuit 140 as the reference image data RD.

Corresponding to the intra-frame coding technology, no motion compensation is required. As a result, the front-end decoding circuit 120 does not retrieve the corresponding motion vector information MV and only retrieves the corresponding residue information RES. The estimation circuit 140 performs calculation according to the reference image data RD from the decoded part within the same image frame in the decoding process according to the intra-frame coding technology to generate the estimated pixels EP. The image reconstruction circuit 150 performs calculation according to the estimated pixels EP and the residue information RES in the decoding process to generate the reconstructed pixels RP. The reconstructed pixels RP may serve as the decoded part within the same image frame described above and be fed to the estimation circuit 140 as the reference image data RD. The deblock operation circuit 160 performs deblock operation according to the reconstructed pixels RP in the decoding process to generate the decoded result further output the decoded image frames FD according to the decoded result.

In some usage scenarios, data loss occurs to the image stream IS such that the image decoding apparatus 110 detects error. The condition that the image decoding apparatus 110 detects an error in the N-th image frame $FM_N$ among the N−1-th image frame $FM_{N−1}$, the N-th image frame $FM_N$, ... and the N+P-th image frame $FM_{N−P}$ in the image stream IS is used as an example to describe the processing of the image decoding apparatus 110 in the following paragraphs.

Figure 2A:
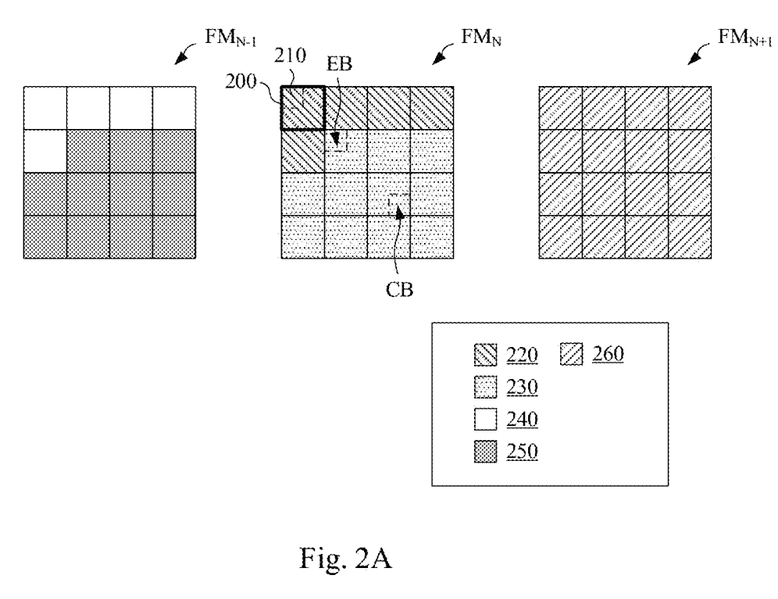
FIG. 2A illustrates a plurality of image frames in the image stream according to an embodiment of the present invention.

Reference is now made to FIG. 2A. FIG. 2A illustrates a plurality of image frames in the image stream IS according to an embodiment of the present invention. More specifically, in FIG. 2A, the N−1-th image frame $FM_{N-1}$, the N-th image frame $FM_N$ and the N+1-th image frame $FM_{N-1}$ in the image stream IS are illustrated.

In an embodiment, each of the image frames in the image stream IS may include a plurality of image processing blocks. Each of these image processing blocks has a size for the front-end decoding circuit 120 to read and process, e.g., 64×64. In FIG. 2A, only one image processing block 200 is exemplarily labeled. Each of the image processing blocks includes a plurality of encoding unit blocks. Each of these encoding unit blocks has a size for the image encoding apparatus 100 to perform a single time of encoding, e.g., 32×32, 16×16 or 8×8. In FIG. 2A, only one encoding unit block 210 in the image processing block 200 is exemplarily labeled. Actually, the image processing blocks may include encoding unit blocks either having the same size or having different sizes. It is appreciated that the size of the image processing blocks, the size of the encoding unit blocks and the number of the encoding unit blocks included in each of the image processing blocks are merely an example. The present invention is not limited thereto.

The front-end decoding circuit 120 determines an occurrence of an error block EB in the N-th image frame $FM_N$ generated according to the inter-frame coding technology in the image stream IS from the image encoding apparatus 100.

Once the front-end decoding circuit 120 determines the occurrence of the error block EB, the front-end decoding circuit 120 transmits the error report information ER to the image encoding apparatus 100, such that the image encoding apparatus 100 receives the error report information ER at a time spot that the image decoding apparatus 110 receives a corresponding block CB of an N+P−1-th image frame $FM_{N+P-1}$. In the present embodiment, P is 1. In other words, in FIG. 2A, the corresponding block CB is in the N-th image frame $FM_N$.

The image encoding apparatus 100 treats the N+P-th image frame $FM_N$. P (which is the N+1-th image frame $FM_{N-1}$ in the present embodiment) as a new slice, so as to encode the N+P-th image frame $FM_{N+P}$ (which is the N+1-th image frame $FM_{N+1}$ in the present embodiment) in the image stream IS by referring to a reference image frame previous to the N+P−1-th image frame $FM_{N+P-1}$ (which is the N-th image frame $FM_N$ in the present embodiment) that includes no error according to the inter-frame coding technology. In an embodiment, such a reference image frame is a previous image frame neighboring to the N+P−1-th image frame $FM_{N+P-1}$, i.e., the N+P−2-th image frame $FM_{N+P-2}$ (which is the N−1-th image frame $FM_{N-1}$ in the present embodiment).

The front-end decoding circuit 120 retrieves the motion vector information MV and the residue information RES corresponding to a plurality of the first blocks 220 in the N-th image frame $FM_N$ before the occurrence of the error block EB from the image stream IS. In FIG. 2A, the first blocks 220 before the occurrence of the error block EB are illustrated as blocks having slashes.

The back-end decoding circuit 130 performs the decoding process on the first blocks 200 according to the inter-frame coding technology to generate the first decoded result DR1.

More specifically, for the N-th image frame $FM_N$, the back-end decoding circuit 130 retrieves the previous decoded image frame (e.g., receiving the decoded image frame $FD_{N-1}$ fed from the deblock operation circuit 160 by the estimation circuit 140) as the reference image data RD to perform the decoding process on the first blocks 220 according to the inter-frame coding technology. The estimation circuit 140 performs calculation according to the reference image data RD and the motion vector information MV in the decoding process according to the inter-frame coding technology to generate the estimated pixels EP. The image reconstruction circuit 150 performs calculation according to the estimated pixels EP and the residue information RES in the decoding process to generate the reconstructed pixels RP. The deblock operation circuit 160 performs deblock operation according to the reconstructed pixels RP in the decoding process to generate the first decoded result DR1.

On the other hand, the front-end decoding circuit 120 retrieves a panning motion vector from the N−1-th image frame $FM_{N-1}$ identified to be a panning image frame to set the panning motion vector to be the motion vector information MV and sets the residue information RES to be a zero value. The method of retrieving the panning motion vector and the method of identifying the image frame to be the panning image frame are described later.

The back-end decoding circuit 130 performs the decoding process on a plurality of second blocks 230 from the error block EB in the N-th image frame $FM_N$ to a final block of the N+P−1-th image frame $FM_{N+P-1}$ (which is the N-th image frame $FM_N$ in the present embodiment) by referring to the N−1-th image frame $FM_{N-1}$ to an N+P−2-th image frame $FM_{N+P-2}$ in turn according to the inter-frame coding technology to generate a second decoded result DR2. In FIG. 2A, the second blocks 230 from the error block EB to the final block of the N+P−1-th image frame $FM_{N+P-1}$ are illustrated as dotted blocks.

More specifically, the back-end decoding circuit 130 uses the previous decoded image frame $FD_{N-1}$ corresponding to the N−1-th image frame $FM_{N-1}$ as the reference image data RD to perform the decoding process on the second blocks 230, such that the estimation circuit 140 performs calculation according to the reference image data RD and the motion vector information MV set to be the zero vector in the decoding process to generate the estimated pixels EP. The image reconstruction circuit 150 performs calculation according to the estimated pixels EP and the residue information RES set to be the zero value in the decoding process to generate the reconstructed pixels RP. The deblock operation circuit 160 performs deblock operation according to the reconstructed pixels RP in the decoding process to generate the second decoded result DR2.

The back-end decoding circuit 130 outputs the first decoded result DR1 and the second decoded result DR2 to be the N-th decoded image frame $FD_N$. More specifically, after generating the first decoded result DR1 and the second decoded result DR2, the deblock operation circuit 160 of the back-end decoding circuit 130 merges the first decoded result DR1 and the second decoded result DR2 to be outputted as the N-th decoded image frame $FD_N$.

As a result, for the present embodiment, the first blocks 220 in the N-th image frame $FM_N$ are generated by referring to the blocks 240 in the N−1-th image frame $FM_{N-1}$ to further perform calculation thereon according to the motion vector information MV and the residue information RES transmitted by the image encoding apparatus 100. In FIG. 2A, the blocks 240 are illustrated as blanked blocks. On the other hand, the second blocks 230 in the N-th image frame $FM_N$ are generated by referring to the blocks 250 in the N−1-th image frame $FM_{N-1}$ according to the panning motion vector. In FIG. 2A, the blocks 250 are illustrated as gray blocks.

In the present embodiment, the N+P-th image frame $FM_{N+P}$ (which is the N+1-th image frame $FM_{N+1}$ in the present embodiment) only includes a plurality of inter-frame coding blocks 260. In FIG. 2A, the inter-frame coding blocks 260 are illustrated as blocks having back slashes.

The front-end decoding circuit 120 retrieves the motion vector information MV and the residue information RES corresponding to the inter-frame coding blocks 260 in the N+1-th image frame $FM_{N+1}$ from the image stream IS.

The back-end decoding circuit 130 performs the decoding process on the inter-frame coding blocks 260 according to the inter-frame coding technology to generate an inter-frame decoded result ITE.

More specifically, the back-end decoding circuit 130 retrieves the previous decoded image frame to be the reference image data RD to perform the decoding process on the inter-frame coding blocks 260 according to the inter-frame coding technology. The previous decoded image frame is a decoded frame corresponds to an image frame previous to the N-th image frame FMN that includes no error, e.g., the decoded image frame of the N−1-th image frame $FM_{N-1}$. The estimation circuit 140, the image reconstruction circuit 150 and the deblock operation circuit 160 perform decoding process in a sequential manner to generate the inter-frame decoded result ITE.

The back-end decoding circuit 130 further outputs the inter-frame decoded result ITE to be the N+1-th decoded image frame $FD_{N+1}$. More specifically, after generating the inter-frame decoded result ITE, the deblock operation circuit 160 of the back-end decoding circuit 130 outputs the inter-frame decoded result ITE to be the N+1-th decoded image frame $FD_{N+1}$.

Figure 2B:
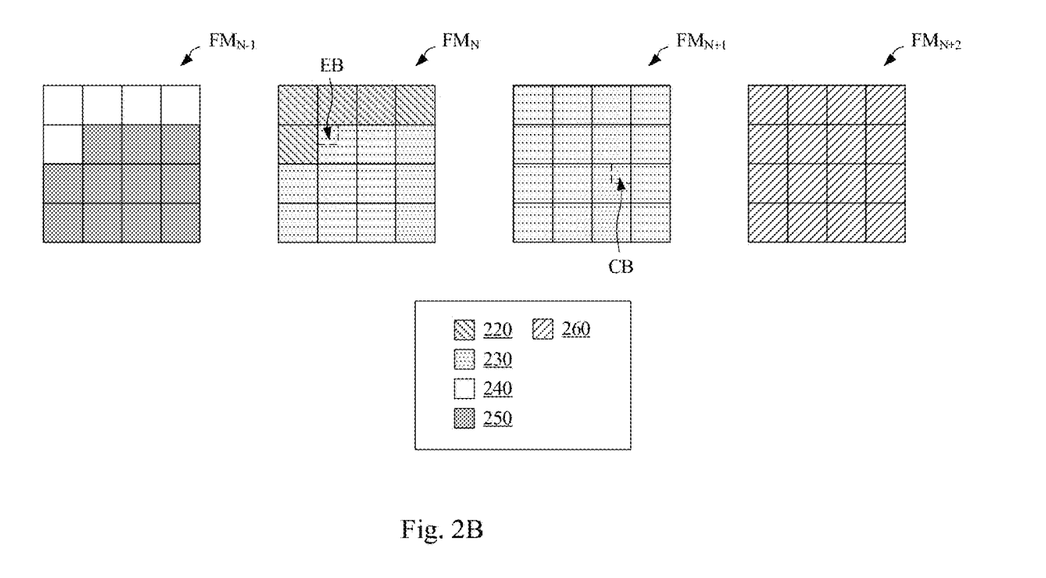
FIG. 2B illustrates a plurality of image frames in the image stream according to an embodiment of the present invention.

FIG. 2B illustrates a plurality of image frames in the image stream IS according to an embodiment of the present invention. More specifically, in FIG. 2B, the N−1-th image frame $FM_{N-1}$, the N-th image frame $FM_N$, the N+1-th image frame $FM_{N+1}$ and the N+2-th image frame $FM_{N+2}$ in the image stream IS are illustrated.

The content included by these image frames, e.g., the image processing blocks and the encoding unit blocks included by the image processing blocks are the same as those in FIG. 2A. The detail is not described herein.

Similar to the operation corresponding to FIG. 2A, the front-end decoding circuit 120 determines the occurrence of the error block EB in the N-th image frame $FM_N$ and transmits the error report information ER to the image encoding apparatus 100, such that the image encoding apparatus 100 receives the error report information ER at the time spot that the image decoding apparatus 110 receives the corresponding block CB of the N+P−1-th image frame $FM_{N+P-1}$ in the image stream IS. In the present embodiment, P is larger than 1. In FIG. 2B, the condition that P is 2 is illustrated to describe the operation. In other words, in FIG. 2B, the corresponding block CB resides in the N+1-th image frame $FM_{N+1}$.

The image encoding apparatus 100 treats the N+P-th image frame $FM_{N+P}$ (which is the N+2-th image frame $FM_{N+2}$ in the present embodiment) as the new slice, so as to encode the N+P-th image frame $FM_{N+P}$ in the image stream IS according to the inter-frame coding technology. Similarly, in an embodiment, such a reference image frame is a previous image frame neighboring to the N-th image frame $FM_N$, which is the N−1-th image frame $FM_{N-1}$.

The processing of the first blocks 220 before the occurrence of the error block EB in the N-th image frame $FM_N$ performed by the front-end decoding circuit 120 and the back-end decoding circuit 130 is the same as that described along with FIG. 2A such that the first decoded result DR1 is generated by the back-end decoding circuit 130. The detail is not described herein.

On the other hand, the front-end decoding circuit 120 retrieves a panning motion vector from the N−1-th image frame $FM_{N-1}$ identified to be a panning image frame to set the panning motion vector to be the motion vector information MV and sets the residue information RES to be a zero value.

The back-end decoding circuit 130 performs the decoding process on a plurality of second blocks 230 from the error block EB in the N-th image frame $FM_N$ to a final block of the N+P−1-th image frame $FM_{N+P-1}$ (which is the N+1-th image frame $FM_{N+1}$ in the present embodiment) by referring to the N−1-th image frame $FM_{N-1}$ to an N+P−2-th image frame $FM_{N+P-2}$ in turn according to the inter-frame coding technology to generate a second decoded result DR2. In FIG. 2B, the second blocks 230 from the error block EB to the final block of the N+1-th image frame $FM_{N+1}$ are illustrated as dotted blocks.

More specifically, the back-end decoding circuit 130 uses the previous decoded image frame $FD_{N-1}$ corresponding to the N−1-th image frame $FM_{N-1}$ as the reference image data RD to perform the decoding process on the second blocks 230 corresponding to the N-th image frame $FM_N$ by referring to the previous decoded image frame $FD_{N-1}$ according to the panning motion vector, such that the estimation circuit 140, the image reconstruction circuit 150 and the deblock operation circuit 160 perform decoding process in a sequential manner to generate a first part of the second decoded result DR2.

The back-end decoding circuit 130 outputs the first decoded result DR1 and the first part of the second decoded result DR2 to be the N-th decoded image frame $FD_N$. More specifically, after generating the first decoded result DR1 and the first part of the second decoded result DR2, the deblock operation circuit 160 of the back-end decoding circuit 130 merges the first decoded result DR1 and the first part of the second decoded result DR2 to be outputted as the N-th decoded image frame $FD_N$.

Further, the back-end decoding circuit 130 uses the previous decoded image frame $FD_N$ corresponding to the N-th image frame $FM_N$ as the reference image data RD to perform the decoding process on the second blocks 230 corresponding to the N+1-th image frame $FM_{N-1}$ by referring to the previous decoded image frame $FD_N$ according to the panning motion vector, such that the estimation circuit 140, the image reconstruction circuit 150 and the deblock operation circuit 160 perform decoding process in a sequential manner to generate a second part of the second decoded result DR2.

The back-end decoding circuit 130 outputs the second part of the second decoded result DR2 to be the N+1-th decoded image frame $FD_{N-1}$. More specifically, after generating the second part of the second decoded result DR2, the deblock operation circuit 160 of the back-end decoding circuit 130 outputs the second part of the second decoded result DR2 to be the N+1-th decoded image frame $FD_{N+1}$.

Since the motion vector information MV is the panning motion vector and the residue information RES is the zero value, the first part of the second decoded result DR2 (i.e., the part of the N-th decoded image frame $FD_N$ corresponding to the second blocks 230) is generated by referring to the content of the reference image data RD, i.e., the part of the N−1-th decoded image frame $FD_{N-1}$ corresponding to the blocks 250 according to the panning motion vector. The second part of the second decoded result DR2 (i.e., the part of the N+1-th decoded image frame $FD_{N-1}$ corresponding to the second blocks 230) is generated by referring to the content of the reference image data RD, i.e., the N-th decoded image frame $FD_N$ according to the panning motion vector.

It is appreciated that when P is any integer larger than 2, the back-end decoding circuit 130 can output the second part of the second decoded result DR2 to be the N+1-th decoded image frame to the N+P−1-th decoded image frame. Further, when P is any integer larger than 2, the contents in the N+1-th decoded image frame to the N+P−1-th decoded image frame are generated by referring to the N-th image frame to an N+P−2-th image frame in turn. In other words, the N+1-th decoded image frame is generated by referring to the N-th decoded image frame, the N+2-th decoded image frame is generated by referring to the N+1-th decoded image frame, so on and so forth until the N+P−1-th decoded image frame is generated by referring to the N+P−2-th decoded image frame.

In the present embodiment, the N+P-th image frame $FM_{N+P}$ (which is the N+2-th image frame $FM_{N+2}$ in the present embodiment) only includes a plurality of inter-frame coding blocks 260. In FIG. 2B, the inter-frame coding blocks 260 are illustrated as blocks having back slashes.

The front-end decoding circuit 120 retrieves the motion vector information MV and the residue information RES corresponding to the inter-frame coding blocks 260 in the N+1-th image frame $FM_{N+1}$ from the image stream IS.

The back-end decoding circuit 130 performs the decoding process on the inter-frame coding blocks 260 according to the inter-frame coding technology to generate an inter-frame decoded result ITE. The decoding process performed by the back-end decoding circuit 130 is identical to the decoding process described in accompany with FIG. 2A. The detail is not described herein.

The back-end decoding circuit 130 further outputs the inter-frame decoded result ITE to be the N+P-th decoded image frame $FD_{N+P}$ (which is the N+2-th decoded image frame $FD_{N+2}$ in the present embodiment). More specifically, after generating the inter-frame decoded result ITE, the deblock operation circuit 160 of the back-end decoding circuit 130 outputs the inter-frame decoded result ITE to be the N+2-th decoded image frame $FD_{N+2}$.

In an embodiment, in the two embodiments described above, the image encoding apparatus 100 may determine that no error block is presented in the N+P-th image frame $FM_{N+P}$ when no error report information related to the N+P-th image frame $FM_{N+P}$ is received from the image decoding apparatus 110. Subsequently, the image encoding apparatus 100 starts to perform the encoding process on the next image frame (e.g., the N+P+1-th image frame) according to the inter-frame coding technology by referring to the decoded image frame(s) that the default previous image frame(s) (e.g., the previous one image frame, which is the N+P-th image frame $FM_{N+P}$) corresponds to, instead of referring to the decoded image frame that the reference image frame previous to the N-th image frame having no error corresponds to. The image decoding apparatus 110 thus keeps performing the decoding process by retrieving the corresponding motion vector information and the corresponding residue information according to the inter-frame coding technology. However, the present invention is not limited thereto.

Based on the method described above, the back-end decoding circuit 130 in FIG. 1 performs the decoding process on the image blocks from the error block in the N-th image frame to the N+P−1-th image frame according to the panning motion vector from the N−1-th image frame $FM_{N-1}$ identified to be the panning image frame to maintain the fluency of the image frame decoding.

The method of retrieving of the panning motion vector is described in the following paragraphs.

Figure 3:
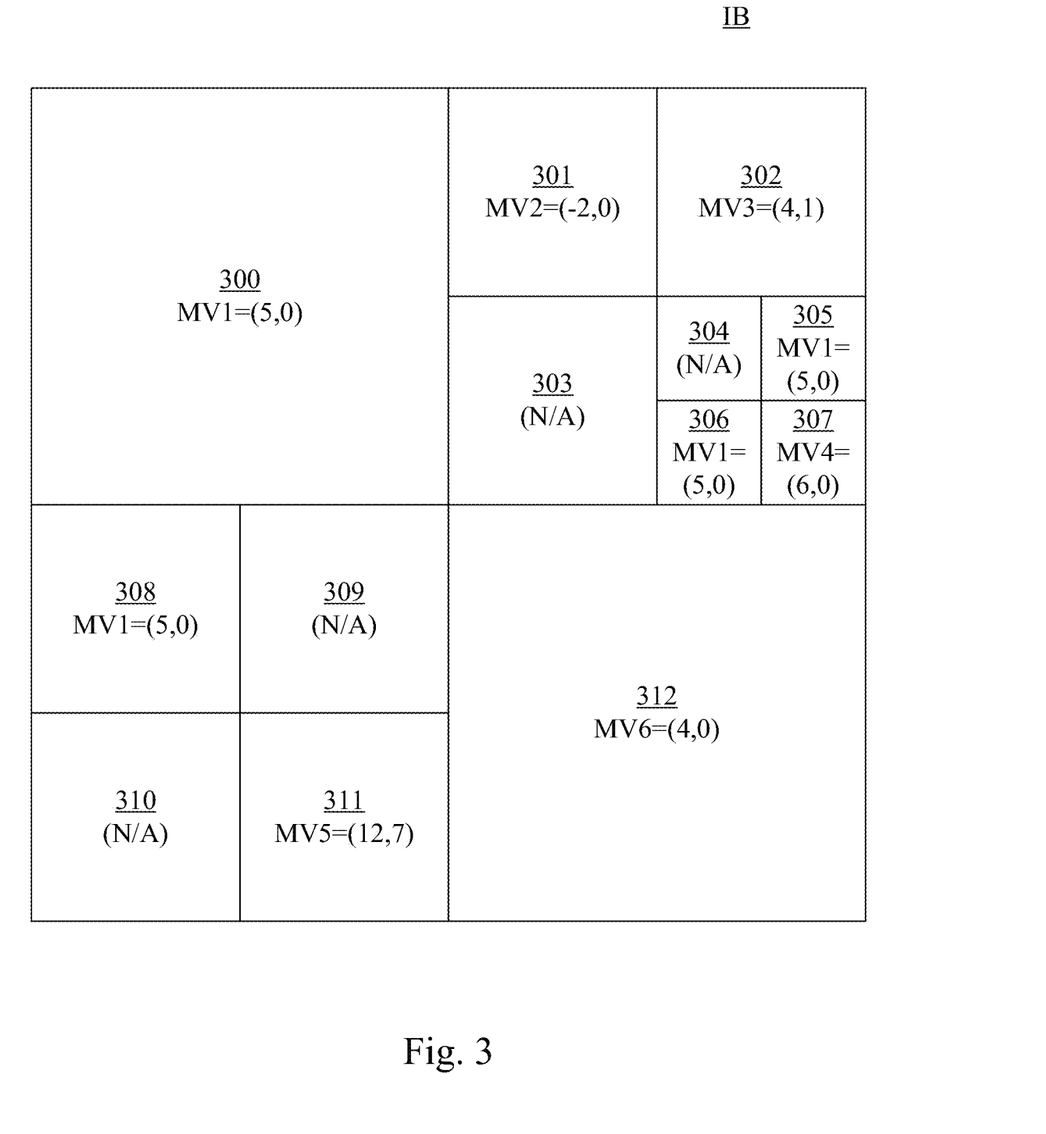
FIG. 3 illustrates an image processing block in an image frame according to an embodiment of the present invention.

Reference is now made to FIG. 3. FIG. 3 illustrates an image processing block IB in an image frame according to an embodiment of the present invention. In an embodiment, the size of the image processing block IB is 64×64 and the image processing block IB includes encoding unit blocks 300~312.

For each of the image frames, the front-end decoding circuit 120 retrieves a plurality of unit block motion vectors that the encoding unit blocks of each of the image processing blocks correspond to.

Take the encoding unit blocks 300~312 in FIG. 3 as an example, the encoding unit block 300 has a size of 32×32 and has a unit block motion vector MV1 of (5,0). The encoding unit block 301 has a size of 16×16 and has a unit block motion vector MV2 of (−2,0). The encoding unit block 302 has a size of 16×16 and has a unit block motion vector MV3 of (4,1). The encoding unit block 303 has a size of 16×16 and is a block encoded by using the intra-frame coding technology without having an unit block motion vector such that it is labeled by N/A.

The encoding unit block 304 has a size of 8×8 and is a block encoded by using the intra-frame coding technology without having an unit block motion vector such that it is labeled by N/A. The encoding unit block 305 has a size of 8×8 and has the unit block motion vector MV1 of (5,0). The encoding unit block 306 has a size of 8×8 and has the unit block motion vector MV1 of (5,0). The encoding unit block 307 has a size of 8×8 and has a unit block motion vector MV4 of (6,0).

The encoding unit block 308 has a size of 16×16 and has the unit block motion vector MV1 of (5,0). The encoding unit block 309 has a size of 16×16 and is a block encoded by using the intra-frame coding technology without having an unit block motion vector such that it is labeled by N/A. The encoding unit block 310 has a size of 16×16 and is a block encoded by using the intra-frame coding technology without having an unit block motion vector such that it is labeled by N/A. The encoding unit block 311 has a size of 16×16 and has a unit block motion vector MV5 of (12,7). The encoding unit block 312 has a size of 32×32 and has a unit block motion vector MV6 of (4,0).

The front-end decoding circuit 120 performs first statistics process on the unit block motion vectors that each of the image processing blocks of each of the image frames correspond to. In an embodiment, in the first statistics process and for each of the processing blocks, the front-end decoding circuit 120 performs steps outlined below.

At first, the front-end decoding circuit 120 sets a plurality of first weighting values each corresponding to one the encoding unit blocks according to the sizes of the encoding unit blocks. Take the embodiment in FIG. 3 as an example, when 8×8 corresponds to a single unit of the weighting value, the encoding unit blocks 300~312 respectively have the first weighting values of 16, 4, 4, 4, 1, 1, 1, 1, 4, 4, 4, 4 and 12 units of weighting value.

Subsequently, the front-end decoding circuit 120 accumulates the first weighting values of the encoding unit blocks that each of the unit block motion vectors corresponds to generate a first weighting accumulated value of each of the unit block motion vectors. Take the embodiment in FIG. 3 as an example, the front-end decoding circuit 120 accumulates the first weighting values of the encoding unit block 300, the encoding unit block 305, the encoding unit block 306 and the encoding unit block 308 to obtain the first weighting accumulated value of the unit block motion vector MV1, which is 22 (=16+1+1+4). Since each of the unit block motion vectors MV2~MV6 only corresponds to one encoding unit block, the first weighting accumulated values of the unit block motion vectors MV2~MV6 are respectively 4, 4, 1, 4 and 16.

The front-end decoding circuit 120 determines a largest unit block motion vector having a largest first weighting accumulated value and a second largest unit block motion vector having a second largest first weighting accumulated value from the unit block motion vectors. Take the embodiment in FIG. 3 as an example, the front-end decoding circuit 120 determines that the unit block motion vector MV1 having the largest first weighting accumulated value, which is 22, to be largest unit block motion vector. The front-end decoding circuit 120 further determines that the unit block motion vector MV6 having the second largest first weighting accumulated value, which is 16, to be the second largest unit block motion vector.

The front-end decoding circuit 120 accumulates the first weighting accumulated value that at least one of the unit block motion vectors, having a vector value difference relative to the largest unit block motion vector within a predetermined range, corresponds to and the largest first weighting accumulated value to generate a first unit block accumulated value corresponding to the largest unit block motion vector. In an embodiment, the vector value of a motion vector can be defined as the sum of X value and Y value thereof. The predetermined range can be defined to be a range such as but not limited to having the largest value and the lowest value respectively being the vector value of the largest unit block motion vector plus and minus a value of such as, but not limited to 6.

Take the embodiment in FIG. 3 as an example, the largest unit block motion vector is (5,0), and the vector value thereof is 5+0=5 such that the predetermined range is −1~11. As a result, the first weighting accumulated values 4, 1 and 16 of the unit block motion vectors MV3, MV4 and MV6, each having the vector value within the range of −1~11, are accumulated with the largest first weighting accumulated value, which is 22. The first unit block accumulated value corresponding to the largest unit block motion vector MV1 is thus generated, which is 43 (=22+4+1+16). It is appreciated that the definition of the vector value and the predetermined range described above is merely an example. The present invention is not limited thereto.

The front-end decoding circuit 120 accumulates the first weighting accumulated value that at least one of the unit block motion vectors, having the vector value difference relative to the second largest unit block motion vector within the predetermined range, corresponds to and the second largest first weighting accumulated value to generate a second unit block accumulated value corresponding to the second largest unit block motion vector. Take the embodiment in FIG. 3 as an example, under the condition that the values related to the motion vectors are the same, the second largest unit block motion vector MV6 is (4,0), and the vector value thereof is 4+0=4 such that the predetermined range is −2~10. As a result, the first weighting accumulated values 22, 4 and 1 of the unit block motion vectors MV1, MV3 and MV4, each having the vector value within the range of −2~10, are accumulated with the second largest first weighting accumulated value, which is 16. The second unit block accumulated value corresponding to the second largest unit block motion vector MV6 is thus generated, which is 43 (=16+22+4+1).

The front-end decoding circuit 120 determines a largest unit block accumulated value of the first unit block accumulated value and the second unit block accumulated value, so as to select one of the largest unit block motion vector and the second largest unit block motion vector that corresponds to the largest unit block accumulated value to be one of the unit block motion vectors having the highest appearance frequency. Take the embodiment in FIG. 3 as an example, both of the first unit block accumulated value and the second unit block accumulated value are 43. The front-end decoding circuit 120 may select any one of the accumulated values, e.g., the first unit block accumulated value to be the largest unit block accumulated value, and selects the largest unit block motion vector MV1 corresponding thereto to be the unit block motion vectors having the highest appearance frequency.

Moreover, the front-end decoding circuit 120 sets a plurality of processing block motion vectors that the image processing blocks correspond to, wherein each of the processing block motion vectors is one of the unit block motion vectors having a highest appearance frequency in one of the image processing blocks. Take the embodiment in FIG. 3 as an example, the front-end decoding circuit 120 sets the unit block motion vector MV1 having the highest appearance frequency in the image processing block 300 to be the processing block motion vector of the image processing block 300.

After the processing block motion vectors that all the image processing blocks in an image frame correspond to are set by using the method described above, the front-end decoding circuit 120 performs a second statistics process on the processing block motion vectors that the image processing blocks of each of the image frames correspond to.

The second statistics process is actually similar to the first statistics process besides that the role of the encoding unit blocks in the first statistics process is replaced by the image processing blocks in the second statistics process, and the role of the unit block motion vectors in the first statistics process is replaced by the processing block motion vectors in the second statistics process.

More specifically, in the second statistics process, the front-end decoding circuit 120 sets a plurality of second weighting values each corresponding to one the image processing blocks according to the sizes of the image processing blocks and accumulates the second weighting values of the image processing blocks that each of the processing block motion vectors corresponds to generate a second weighting accumulated value of each of the processing block motion vectors.

Further, the front-end decoding circuit 120 determines a largest processing block motion vector having a largest second weighting accumulated value and a second largest processing block motion vector having a second largest second weighting accumulated value from the processing block motion vectors, and accumulates the second weighting accumulated value that at least one of the processing block motion vectors, having a vector value difference relative to the largest processing block motion vector within a predetermined range, corresponds to and the largest second weighting accumulated value to generate a first processing block accumulated value corresponding to the largest processing block motion vector. The front-end decoding circuit 120 further accumulates the second weighting accumulated value that at least one of the processing block motion vectors, having the vector value difference relative to the second largest processing block motion vector within the predetermined range, corresponds to and the second largest second weighting accumulated value to generate a second processing block accumulated value corresponding to the second largest processing block motion vector.

Lastly, the front-end decoding circuit 120 determines a largest processing block accumulated value of the first processing block accumulated value and the second processing block accumulated value, so as to select one of the largest processing block motion vector and the second largest processing block motion vector that corresponds to the largest processing block accumulated value to be one of the processing block motion vectors having the highest appearance frequency.

Moreover, the front-end decoding circuit 120 sets a plurality of frame motion vectors that the image frames correspond to, wherein each of the frame motion vectors is one of the processing block motion vectors having a highest appearance frequency in one of the image frames. The front-end decoding circuit 120 may further retrieve one of the frame motion vectors that the N−1-th image frame $FM_{N-1}$ corresponds to be the panning motion vector.

The method of identifying an image frame to be the panning image frame is described in the following paragraphs.

For each of the image frames, the front-end decoding circuit 120 calculates a sum of the second weighting accumulated value of all the processing block motion vectors to further calculate a largest motion vector ratio between the largest processing block accumulated value and the sum. In a numerical example, the largest processing block accumulated value of an image frame is 40, the sum of the second weighting accumulated values of all the processing block motion vectors is 50, and the largest motion vector ratio is thus 0.8.

For each of the image frames, the front-end decoding circuit 120 determines that one of the processing block motion vectors having the highest appearance frequency (i.e., the frame motion vector of then image frame) has the vector value difference relative to each of the frame motion vectors of consecutive K previous image frames within a preset range, so as to decrement a threshold value by K predetermined values under a condition that the threshold value is not smaller than a limit value. Further, the front-end decoding circuit 120 identifies any one of the image frames having the largest motion vector ratio larger than the threshold value to be the panning image frame.

In a numerical example, the threshold value is 0.9, the preset rang is 6, the limit value is 0.6 and the predetermined value is 0.05. When the frame motion vector of an image frame has the vector value difference relative to each of the frame motion vector of 0 previous image frame being smaller than 6, the threshold value is not decremented and is kept to be 0.9. Under such a condition, such an image frame is not identified to be the panning image frame since the largest motion vector ratio (0.8) is smaller than the threshold value (0.9). When the frame motion vector of an image frame has the vector value difference relative to each of the frame motion vector of 3 previous image frames being smaller than 6, the threshold value is decremented by 3×0.05=0.15 under the condition that the threshold value is not smaller than 0.6, such that the threshold value becomes 0.75. Under such a condition, such an image frame is identified to be the panning image frame since the largest motion vector ratio (0.8) is larger than the threshold value (0.75).

In an embodiment, front-end decoding circuit 120 may store the frame motion vectors of a plurality of image frames in such as, but not limited to a first-in-first-out circuit (not illustrated) further included by the image decoding apparatus 110 to dynamic decrement the threshold value. The image frame is easier to be identified to be the panning image frame under the condition that the vector value of the image frame is close to the vector values of the motion vectors of a plurality consecutive previous image frames.

It is appreciated that when the background in the image frame is still and only one foreground object is moving, the vector value of the processing block motion vector having the highest appearance frequency can be 0. As a result, the front-end decoding circuit 120 may stop to adjust the threshold value when the vector value of the frame motion vector is 0 to avoid the condition that such an image frame is falsely determined to be the panning image frame.

In some approaches, when the data is lost, the image decoding apparatus may not generate the decoded image frames correctly since the motion vector information and the residue information can not be retrieved.

The image decoding apparatus of the present invention retrieves a panning motion vector from an N−1-th image frame identified to be a panning image frame to set motion vector information to be the panning motion vector and set residue information to be a zero value under the condition that an error block occurs in the N-th image frame, so as to perform decoding on image blocks from the error block to a final block of an N+P−1-th image frame that a corresponding block corresponding to a time spot that the image encoding apparatus receives error report information resides. Such a technology allows the proceeding of the decoding process under the condition that both the accuracy and the fluency of the decoding process are maintained.

Figure 4:
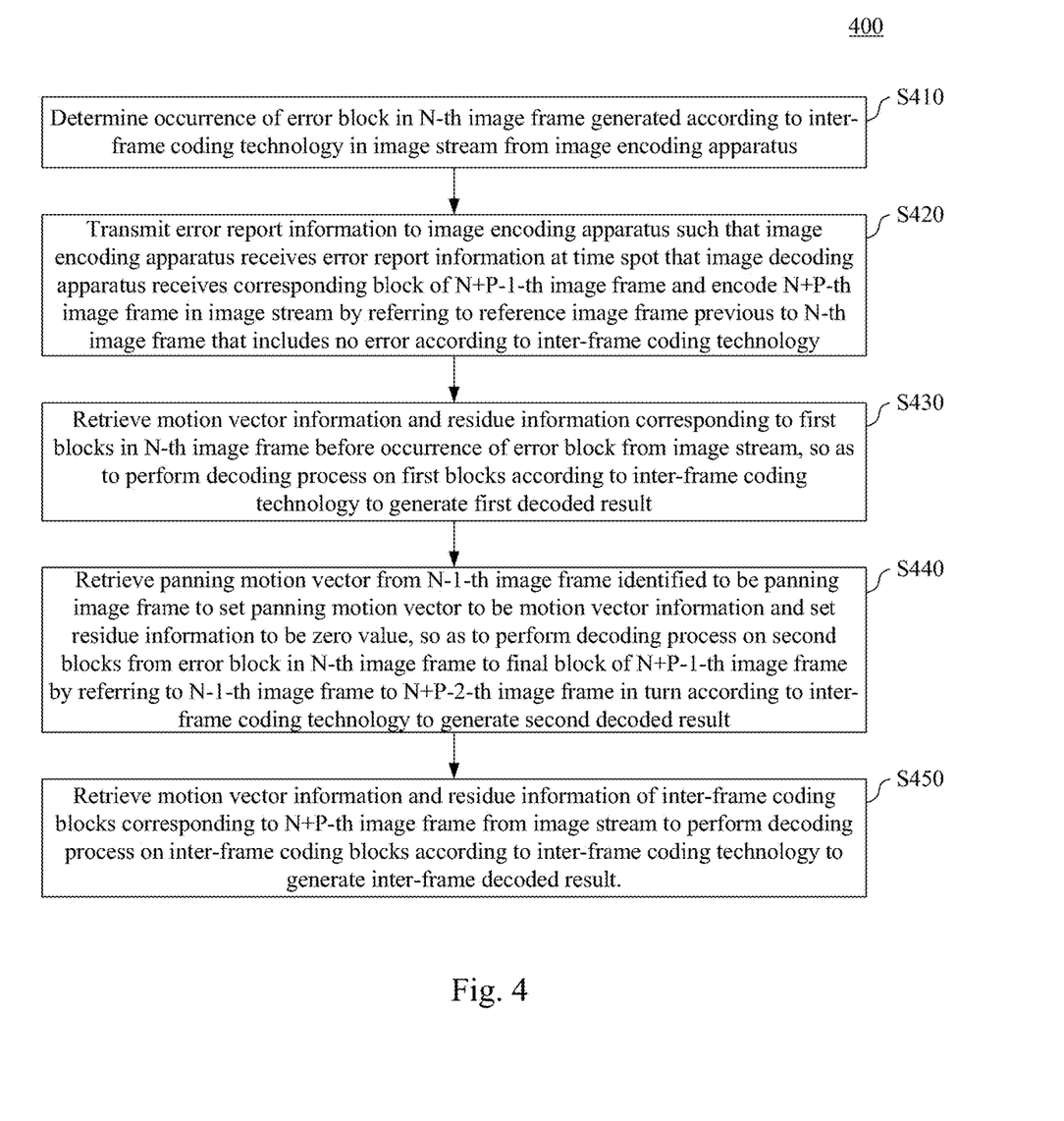
FIG. 4 illustrates a flow chart of an image decoding method according to an embodiment of the present invention.

Reference is now made to FIG. 4. FIG. 4 illustrates a flow chart of an image decoding method 400 according to an embodiment of the present invention.

In addition to the apparatus described above, the present disclosure further provides the image decoding method 400 that can be used in such as, but not limited to, the image decoding apparatus 110 in FIG. 1. As illustrated in FIG. 4, an embodiment of the image decoding method 400 includes the following steps.

In step S410, the occurrence of the error block EB in the N-th image frame FMx generated according to the inter-frame coding technology in the image stream IS from the image encoding apparatus 100 is determined, wherein N is an integer larger than 1.

In step S420, the error report information ER is transmitted to the image encoding apparatus 100 such that the image encoding apparatus 100 receives the error report information ER at the time spot that the image decoding apparatus 110 receives the corresponding block CB of the N+P−1-th image frame $FM_{N+P-1}$ and encodes the N+P-th image frame $FM_{N+P}$ in the image stream IS by referring to the reference image frame previous to the N-th image frame $FM_N$ that includes no error according to the inter-frame coding technology, wherein P is an integer larger than or equal to 1.

In step S430, the motion vector information MV and the residue information RES corresponding to the first blocks 220 in the N-th image frame $FM_N$ before the occurrence of the error block EB are retrieved from the image stream IS, so as to perform the decoding process on the first blocks 220 according to the inter-frame coding technology to generate the first decoded result DR1.

In step S440, the panning motion vector is retrieved from the N−1-th image frame $FM_{N-1}$ identified to be the panning image frame to set the panning motion vector to be the motion vector information MV and setting the residue information RES to be the zero value, so as to perform the decoding process on the second blocks 230 from the error block EB in the N-th image frame $FM_N$ to the final block of the N+P−1-th image frame $FM_{N+P-1}$ by referring to the N−1-th image frame $FM_{N-1}$ to the N+P−2-th image frame $FM_{N+P-2}$ in turn according to the inter-frame coding technology to generate the second decoded result DR2.

In step S450, the motion vector information MV and the residue information RES of the inter-frame coding blocks 260 corresponding to the N+P-th image frame $FM_{N+P}$ are retrieved from the image stream IS to perform the decoding process on the inter-frame coding blocks 260 according to the inter-frame coding technology to generate the inter-frame decoded result ITE.

It is appreciated that the embodiments described above are merely an example. In other embodiments, it should be appreciated that many modifications and changes may be made by those of ordinary skill in the art without departing, from the spirit of the disclosure.

In summary, the present invention discloses the image decoding apparatus and the image decoding method that retrieve a panning motion vector from an N−1-th image frame identified to be a panning image frame to set motion vector information to be the panning motion vector and set residue information to be a zero value under the condition that an error block occurs in the N-th image frame, so as to perform decoding on image blocks from the error block to a final block of an N+P−1-th image frame that a corresponding block corresponding to a time spot that the image encoding apparatus receives error report information resides. Such a technology allows the proceeding of the decoding process under the condition that both the accuracy and the fluency of the decoding process are maintained.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An image decoding method used in an image decoding apparatus comprising:

determining an occurrence of an error block in an N-th image frame generated according to an inter-frame coding technology in an image stream from an image encoding apparatus, wherein N is an integer larger than 1;

transmitting error report information to the image encoding apparatus such that the image encoding apparatus receives the error report information at a time spot that the image decoding apparatus receives a corresponding block of an N+P−1-th image frame and encodes an N+P-th image frame in the image stream by referring to a reference image frame previous to the N-th image frame that comprises no error according to the inter-frame coding technology, wherein P is an integer larger than or equal to 1;

retrieving motion vector information and residue information corresponding to a plurality of first blocks in the N-th image frame before the occurrence of the error block from the image stream, so as to perform a decoding process on the first blocks according to the inter-frame coding technology to generate a first decoded result;

retrieving a panning motion vector from an N−1-th image frame identified to be a panning image frame to set the panning motion vector to be the motion vector information and setting the residue information to be a zero value, so as to perform the decoding process on a plurality of second blocks from the error block in the N-th image frame to a final block of the N+P−1-th image frame by referring to the N−1-th image frame to an N+P−2-th image frame in turn according to the inter-frame coding technology to generate a second decoded result; and retrieving the motion vector information and the residue information of a plurality of inter-frame coding blocks corresponding to the N+P-th image frame from the image stream to perform the decoding process on the inter-frame coding blocks according to the inter-frame coding technology to generate an inter-frame decoded result.

2. The image decoding method of claim 1, further comprising:

outputting the first decoded result and the second decoded result to be an N-th decoded image frame and outputting the inter-frame decoded result to be an N+P-th decoded image frame when P is 1; and outputting the first decoded result and a first part of the second decoded result to be the N-th decoded image frame, outputting a second part of the second decoded result to be an N+1-th decoded image frame to an N+P−1-th decoded image frame and outputting the inter-frame decoded result to be the N+P-th decoded image frame when P is larger than 1.

3. The image decoding method of claim 1, further comprising:

retrieving a previous decoded image frame to be reference image data according to the inter-frame coding technology to perform the decoding process; and setting a decoded part of the N+P-th image frame to be the reference image data according to the inter-frame coding technology to perform the decoding process.

4. The image decoding method of claim 3, wherein the reference image frame is the N−1-th image frame, the image decoding method further comprising:

corresponding to the N+P-th image frame, retrieving the previous decoded image frame corresponding to the N−1-th image frame to be the reference image data to perform the decoding process according to the inter-frame coding technology.

5. The image decoding method of claim 3, further comprising:

performing calculation according to the reference image data and the motion vector information in the decoding process according to the inter-frame coding technology to generate a plurality of estimated pixels;

performing calculation according to the estimated pixels and the residue information in the decoding process to generate a plurality of reconstructed pixels; and performing deblock operation according to the reconstructed pixels in the decoding process to generate the first decoded result corresponding to the first blocks and generate the second decoded result corresponding to the second blocks.

6. The image decoding method of claim 3, further comprising:

performing calculation according to the reference image data in the decoding process according to the inter-frame coding technology to generate a plurality of estimated pixels;

performing calculation according to the estimated pixels and the residue information in the decoding process to generate a plurality of reconstructed pixels; and performing deblock operation according to the reconstructed pixels in the decoding process to generate the inter-frame decoded result corresponding to the inter-frame coding blocks.

7. The image decoding method of claim 1, wherein each of a plurality of image frames in the image stream comprises a plurality of image processing blocks and each of the image processing blocks comprises a plurality of encoding unit blocks, the image decoding method further comprising:
- for each of the image frames, retrieving a plurality of unit block motion vectors that the encoding unit blocks of each of the image processing blocks correspond to;
- performing a first statistics process on the unit block motion vectors that each of the image processing blocks of each of the image frames correspond to;
- for each of the image frames, setting a plurality of processing block motion vectors that the image processing blocks correspond to, wherein each of the processing block motion vectors is one of the unit block motion vectors having a highest appearance frequency in one of the image processing blocks;
- performing a second statistics process on the processing block motion vectors that the image processing blocks of each of the image frames correspond to;
- setting a plurality of frame motion vectors that the image frames correspond to, wherein each of the frame motion vectors is one of the processing block motion vectors having a highest appearance frequency in one of the image frames; and
- retrieving one of the frame motion vectors that the N−1-th image frame corresponds to be the panning motion vector.

8. The image decoding method of claim 7, further comprising:
- in the first statistics process and for each of the image processing blocks:
  - setting a plurality of first weighting values each corresponding to one the encoding unit blocks according to the sizes of the encoding unit blocks;
  - accumulating the first weighting values of the encoding unit blocks that each of the unit block motion vectors corresponds to generate a first weighting accumulated value of each of the unit block motion vectors;
  - determining a largest unit block motion vector having a largest first weighting accumulated value and a second largest unit block motion vector having a second largest first weighting accumulated value from the unit block motion vectors;
  - accumulating the first weighting accumulated value that at least one of the unit block motion vectors, having a vector value difference relative to the largest unit block motion vector within a predetermined range, corresponds to and the largest first weighting accumulated value to generate a first unit block accumulated value corresponding to the largest unit block motion vector;
  - accumulating the first weighting accumulated value that at least one of the unit block motion vectors, having the vector value difference relative to the second largest unit block motion vector within the predetermined range, corresponds to and the second largest first weighting accumulated value to generate a second unit block accumulated value corresponding to the second largest unit block motion vector; and
  - determining a largest unit block accumulated value of the first unit block accumulated value and the second unit block accumulated value, so as to select one of the largest unit block motion vector and the second largest unit block motion vector that corresponds to the largest unit block accumulated value to be one of the unit block motion vectors having the highest appearance frequency; and
- in the second statistics process and for each the image frames:
  - setting a plurality of second weighting values each corresponding to one the image processing blocks according to the sizes of the image processing blocks;
  - accumulating the second weighting values of the image processing blocks that each of the processing block motion vectors corresponds to generate a second weighting accumulated value of each of the processing block motion vectors;
  - determining a largest processing block motion vector having a largest second weighting accumulated value and a second largest processing block motion vector having a second largest second weighting accumulated value from the processing block motion vectors;
  - accumulating the second weighting accumulated value that at least one of the processing block motion vectors, having a vector value difference relative to the largest processing block motion vector within a predetermined range, corresponds to and the largest second weighting accumulated value to generate a first processing block accumulated value corresponding to the largest processing block motion vector;
  - accumulating the second weighting accumulated value that at least one of the processing block motion vectors, having the vector value difference relative to the second largest processing block motion vector within the predetermined range, corresponds to and the second largest second weighting accumulated value to generate a second processing block accumulated value corresponding to the second largest processing block motion vector; and
  - determining a largest processing block accumulated value of the first processing block accumulated value and the second processing block accumulated value, so as to select one of the largest processing block motion vector and the second largest processing block motion vector that corresponds to the largest processing block accumulated value to be one of the processing block motion vectors having the highest appearance frequency.

9. The image decoding method of claim 8, for each of the image frames, the image decoding method further comprising:
- calculating a sum of the second weighting accumulated value of all the processing block motion vectors to further calculate a largest motion vector ratio between the largest processing block accumulated value and the sum;
- determining that one of the processing block motion vectors having the highest appearance frequency has the vector value difference relative to each of the frame motion vectors of consecutive K previous image frames within a preset range, so as to decrement a threshold value by K predetermined values under a condition that the threshold value is not smaller than a limit value; and identifying any one of the image frames having the largest motion vector ratio larger than the threshold value to be the panning image frame.

10. An image decoding apparatus comprising:
a front-end decoding circuit configured to:
  determine an occurrence of an error block in an N-th image frame generated according to an inter-frame coding technology in an image stream from an image encoding apparatus, wherein N is an integer larger than 1; and
  transmit error report information to the image encoding apparatus such that the image encoding apparatus receives the error report information at a time spot that the image decoding apparatus receives a corresponding block of an N+P−1-th image frame and encodes an N+P-th image frame in the image stream by referring to a reference image frame previous to the N-th image frame that comprises no error according to the inter-frame coding technology, wherein P is an integer larger than or equal to 1;
a back-end decoding circuit configured to:
  retrieve motion vector information and residue information corresponding to a plurality of first blocks in the N-th image frame before the occurrence of the error block from the image stream, so as to perform a decoding process on the first blocks according to the inter-frame coding technology to generate a first decoded result;
  retrieve a panning motion vector from an N−1-th image frame identified to be a panning image frame to set the panning motion vector to be the motion vector information and set the residue information to be a zero value, so as to perform the decoding process on a plurality of second blocks from the error block in the N-th image frame to a final block of the N+P−1-th image frame by referring to the N−1-th image frame to an N+P−2-th image frame in turn according to the inter-frame coding technology to generate a second decoded result; and
  retrieve the motion vector information and the residue information of a plurality of inter-frame coding blocks corresponding to the N+P-th image frame from the image stream to perform the decoding process on the inter-frame coding blocks according to the inter-frame coding technology to generate an inter-frame decoded result.

11. The image decoding apparatus of claim 10, wherein the back-end decoding circuit is configured to:
  output the first decoded result and the second decoded result to be an N-th decoded image frame and outputting the inter-frame decoded result to be an N+P-th decoded image frame when P is 1; and
  output the first decoded result and a first part of the second decoded result to be the N-th decoded image frame, outputting a second part of the second decoded result to be an N+1-th decoded image frame to an N+P−1-th decoded image frame and outputting the inter-frame decoded result to be the N+P-th decoded image frame when P is larger than 1.

12. The image decoding apparatus of claim 10, wherein the back-end decoding circuit configured to:
  retrieve a previous decoded image frame to be reference image data according to the inter-frame coding technology to perform the decoding process; and
  set a decoded part of the N+P-th image frame to be the reference image data according to the inter-frame coding technology to perform the decoding process.

13. The image decoding apparatus of claim 12, wherein the reference image frame is the N−1-th image frame, the back-end decoding circuit is configured to:
  corresponding to the N+P-th image frame, retrieve the previous decoded image frame corresponding to the N−1-th image frame to be the reference image data to perform the decoding process according to the inter-frame coding technology.

14. The image decoding apparatus of claim 13, wherein the back-end decoding circuit comprises:
  an estimation circuit configured to perform calculation according to the reference image data and the motion vector information in the decoding process according to the inter-frame coding technology to generate a plurality of estimated pixels;
  an image reconstruction circuit configured to perform calculation according to the estimated pixels and the residue information in the decoding process to generate a plurality of reconstructed pixels; and
  a deblock operation circuit configured to perform deblock operation according to the reconstructed pixels in the decoding process to generate the first decoded result corresponding to the first blocks and generate the second decoded result corresponding to the second blocks.

15. The image decoding apparatus of claim 13, wherein the back-end decoding circuit comprises:
  an estimation circuit configured to perform calculation according to the reference image data in the decoding process according to the inter-frame coding technology to generate a plurality of estimated pixels;
  an image reconstruction circuit configured to perform calculation according to the estimated pixels and the residue information in the decoding process to generate a plurality of reconstructed pixels; and
  a deblock operation circuit configured to perform deblock operation according to the reconstructed pixels in the decoding process to generate the inter-frame decoded result corresponding to the inter-frame coding blocks.

16. The image decoding apparatus of claim 10, wherein each of a plurality of image frames in the image stream comprises a plurality of image processing blocks and each of the image processing blocks comprises a plurality of encoding unit blocks, the front-end decoding circuit is further configured to:
  for each of the image frames, retrieve a plurality of unit block motion vectors that the encoding unit blocks of each of the image processing blocks correspond to;
  perform a first statistics process on the unit block motion vectors that each of the image processing blocks of each of the image frames correspond to;
  for each of the image frames, set a plurality of processing block motion vectors that the image processing blocks correspond to, wherein each of the processing block motion vectors is one of the unit block motion vectors having a highest appearance frequency in one of the image processing blocks;
  perform a second statistics process on the processing block motion vectors that the image processing blocks of each of the image frames correspond to;
  set a plurality of frame motion vectors that the image frames correspond to, wherein each of the frame motion vectors is one of the processing block motion vectors having a highest appearance frequency in one of the image frames; and retrieve one of the frame motion vectors that the N−1-th image frame corresponds to be the panning motion vector.

17. The image decoding apparatus of claim 16, wherein the front-end decoding circuit is further configured to:
   in the first statistics process and for each of the image processing blocks:
   set a plurality of first weighting values each corresponding to one the encoding unit blocks according to the sizes of the encoding unit blocks;
   accumulate the first weighting values of the encoding unit blocks that each of the unit block motion vectors corresponds to generate a first weighting accumulated value of each of the unit block motion vectors;
   determine a largest unit block motion vector having a largest first weighting accumulated value and a second largest unit block motion vector having a second largest first weighting accumulated value from the unit block motion vectors;
   accumulate the first weighting accumulated value that at least one of the unit block motion vectors, having a vector value difference relative to the largest unit block motion vector within a predetermined range, corresponds to and the largest first weighting accumulated value to generate a first unit block accumulated value corresponding to the largest unit block motion vector;
   accumulate the first weighting accumulated value that at least one of the unit block motion vectors, having the vector value difference relative to the second largest unit block motion vector within the predetermined range, corresponds to and the second largest first weighting accumulated value to generate a second unit block accumulated value corresponding to the second largest unit block motion vector; and
   determine a largest unit block accumulated value of the first unit block accumulated value and the second unit block accumulated value, so as to select one of the largest unit block motion vector and the second largest unit block motion vector that corresponds to the largest unit block accumulated value to be one of the unit block motion vectors having the highest appearance frequency; and
   in the second statistics process and for each the image frames:
   set a plurality of second weighting values each corresponding to one the image processing blocks according to the sizes of the image processing blocks;
   accumulate the second weighting values of the image processing blocks that each of the processing block motion vectors corresponds to generate a second weighting accumulated value of each of the processing block motion vectors;
   determine a largest processing block motion vector having a largest second weighting accumulated value and a second largest processing block motion vector having a second largest second weighting accumulated value from the processing block motion vectors;
   accumulate the second weighting accumulated value that at least one of the processing block motion vectors, having a vector value difference relative to the largest processing block motion vector within a predetermined range, corresponds to and the largest second weighting accumulated value to generate a first processing block accumulated value corresponding to the largest processing block motion vector;
   accumulate the second weighting accumulated value that at least one of the processing block motion vectors, having the vector value difference relative to the second largest processing block motion vector within the predetermined range, corresponds to and the second largest second weighting accumulated value to generate a second processing block accumulated value corresponding to the second largest processing block motion vector; and
   determine a largest processing block accumulated value of the first processing block accumulated value and the second processing block accumulated value, so as to select one of the largest processing block motion vector and the second largest processing block motion vector that corresponds to the largest processing block accumulated value to be one of the processing block motion vectors having the highest appearance frequency.

18. The image decoding apparatus of claim 17, wherein for each of the image frames, the front-end decoding circuit is further configured to:
   calculate a sum of the second weighting accumulated value of all the processing block motion vectors to further calculate a largest motion vector ratio between the largest processing block accumulated value and the sum;
   determine that one of the processing block motion vectors having the highest appearance frequency has the vector value difference relative to each of the frame motion vectors of consecutive K previous image frames within a preset range, so as to decrement a threshold value by K predetermined values under a condition that the threshold value is not smaller than a limit value; and
   identify any one of the image frames having the largest motion vector ratio larger than the threshold value to be the panning image frame.

* * * * *